Oct. 7, 1930.                J. F. GIBSON                1,777,665
                      AUTOMATIC CIRCUIT BREAKER
                         Filed July 19, 1928
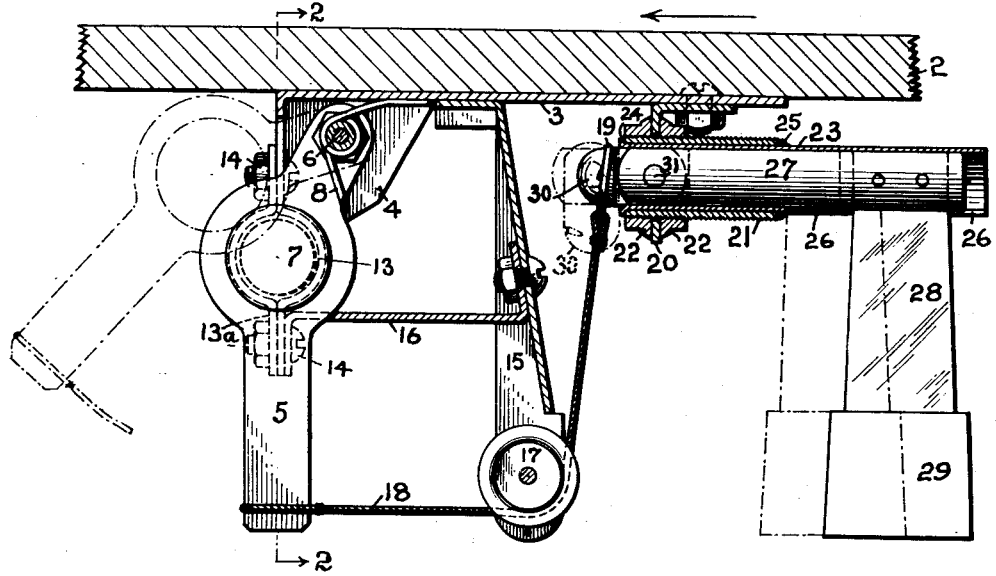
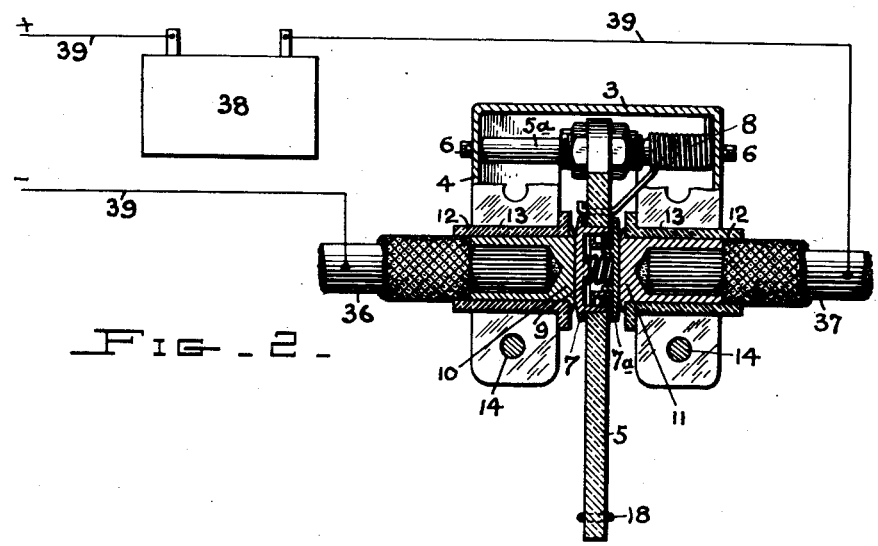
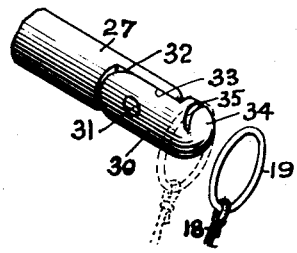
INVENTOR.
Joseph F. Gibson.
BY
ATTORNEY.

Patented Oct. 7, 1930

1,777,665

UNITED STATES PATENT OFFICE

JOSEPH F. GIBSON, OF YORK, PENNSYLVANIA

AUTOMATIC CIRCUIT BREAKER

Application filed July 19, 1928. Serial No. 293,876.

My invention has for its object the automatic breaking of the battery circuit of an automobile in case of a collision of the vehicle with another vehicle or object, imparting a destructive jar, or in case the automobile should turn over from any cause, and thus prevent any possibility of a short circuit of the battery with the attendant danger of igniting gasoline which may escape from the gasoline tank.

My invention consists of a switch structure adapted to be arranged on an automobile in direct circuit with the battery and so constructed that it automatically breaks the circuit when freed and permitted to act under its own impetus, the said circuit breaker being combined with gravity actuated means adapted to produce a rotary motion in case of overturning of the automobile and connecting means between the gravity actuated means and the circuit breaking switch, whereby the latter is released and permitted to automatically interrupt the circuit.

My invention further consists in so constructing the gravity actuated means that it also provides weighted sliding means which, under impact, operates through its inertia to automatically release the connecting means and liberate the circuit breaking switch to permit it to open the circuit.

My improvements in the completed form, therefore, provide in one apparatus capacity for causing the switch to be opened automatically, either by impact or by overturning of the automobile to which the devices are attached and employed for controlling the battery circuit.

My invention also consists of other features of construction as more fully described hereinafter and pointed out in the claims.

My invention will be better understood by reference to the drawings, in which: Fig. 1 is a vertical section showing my improved circuit breaking devices in the position in which they would be placed on an automobile; Fig. 2 is a transverse vertical section through the circuit breaking switch, taken on line 2—2 of Fig. 1; and Fig. 3 is a perspective view of the releasing means for the automatic switch.

2 illustrates any horizontal portion of an automobile and may be, as examples, either a part of the floor or the side structure. 3 is an angular sheet metal plate having box-like corners at 4 to give rigidity, and further having grooved portions 13. 13ª are caps also having grooved portions which are fitted in alinement with the grooved portion 13 and secured in clamping position therewith by bolts 14. Fitted within the grooves and rigidly clamped therein are insulating bushings 12 and these bushings are, in turn, respectively fitted with contact bushings 10 and 11.

38 is the storage battery, such as used on automobiles, and 39 is the battery circuit. 36 is one terminal of that circuit and is soldered in the bushing 10. Similarly, 37 is the other terminal of the battery circuit and is soldered in the bushing 11. The adjacent ends of the contact bushings 10 and 11 are slightly flanged so as to fit over the flanged portions of the insulating bushings 12, so that they cannot separate from each other more than a given distance, as will be understood by reference to Fig. 2.

5 is a switch lever and may be made of vulcanite fiber or other insulating material and is clamped upon a tubular rockshaft 5ª journaled upon a transverse shaft 6 extending through the box-shaped plate portions 4. This provides a long bearing and a very accurate swinging of the switch lever between the terminals 10 and 11 of the battery circuit. The switch lever 5 is provided with an aperture in which is fitted an adjustable contact box formed of the two flanged contact portions 7 and 7ª having interposed between them a coil spring 9 which tends to force them apart and insure positive contact of the part 7 with the terminal bushing 10, and the part 7ª with the terminal bushing 11, as clearly shown in Fig. 2. In addition to the interposed spring 9, the parts 7 and 7ª are internally sleeved with respect to each other, so that when the switch is thrown to the dotted position, Fig. 1, they are prevented from separating beyond what would permit them to properly enter between the contact terminals 10 and 11 when the switch was re-adjusted.

The circuit breaking lever 5 is normally held in a circuit closing position, as shown in Figs. 1 and 2, by a cord 18 and mechanism to be presently described, but is provided with a coil spring 8 having one terminal pressing against the circuit breaking lever and the other terminal connected with the plate 3, as shown, for automatically forcing said lever 5 into the dotted line position indicated in Fig. 1, at which time the circuit is broken.

When the lever 5 is in closed position, as shown in Fig. 1, it is prevented from being drawn beyond the contact bushings 10 and 11 by the bracing plate 16 which is bolted to the plate 3 by the bolts 14, and is also bolted to a frame 15 secured at one end to the plate 3, by welding or otherwise, and carrying at its free end a pivoted guide wheel 17 over which the operating cord 18 for the lever 5 is guided. The bracing plate 16, therefore, performs the dual function of a brace for the plate 15 and also as an abutment for the circuit breaking lever 5.

20 is an angular plate bolted to the plate 3 and providing an upright portion with an aperture through the same. 21 is a tube which extends through the aperture in the plate 20 and is screw threaded upon its outer portion and provided with nuts 22 screwed thereon and adapted to respectively fit at opposite sides of the plate 20, so as to definitely position the tube 21 with respect to said angular plate. Fitting within the tube is a rotary sleeve 23 which is flanged at one end, as at 24, to prevent it sliding within the tube in one direction, and is also provided with a collar at 25 at the other end of the tube to prevent longitudinal sliding within the tube in the opposite direction. In this manner, the sleeve 23 is free to rotate within the tube and its position may be adjusted with respect to the supporting angular plate 20. Sliding within the sleeve 23 is a plunger 27, the same having a downwardly extending plate 28 having at its lower part a weighted portion 29. The plate 28 is guided through a longitudinal slot 26 in the tubular sleeve 23, so as to permit the plunger to reciprocate therein and, at the same time, cause the sleeve to rotate within the tube 21 as a bearing, under the influence of the weighted portion 29. The radial length of the plate 28 dictates the amount of power exerted by the weight 29 in causing the plunger and sleeve to be rotated.

The plunger 27 is provided on its end with a pivoted nose 30 hinged on a transverse pin 31. As shown in Fig. 3, the end of the plunger is rabbeted at 32 and the nose 30 is oppositely rabbeted, as at 33, and the flat surfaces of said parts lie in a vertical plane through the axis of the plunger. The pivoted nose is, in effect, so far as shape is concerned, a continuation of the plunger, and fits within the sleeve 23 as shown in Fig. 1. In that position, the nose is held in alinement with the plunger. If, however, the plunger is moved forward, as indicated in dotted lines, so that the nose is projected beyond the end of the sleeve 23, it will swing downward about its transverse pivot 31, as indicated in dotted lines.

The end 34 of the nose 30 is rounded and is, moreover, provided with a transverse groove 35 at the upper portion of the rounded nose, the same terminating or blending off into the nose on each side thereof. The cord 18 that controls the circuit breaking lever 5 is secured to a ring 19 which is adapted to be hooked over the nose, as indicated in Fig. 1, and dotted lines in Fig. 3, when the circuit breaker is closed and the plunger and nose is in the position indicated by solid lines in Fig. 1.

The operation of the device will now be understood. Assuming that the automobile was in normal running condition and moving in the direction of the arrow, and all of the parts of my improved automatic circuit breaker were in the condition shown in solid lines in Fig. 1, and that the vehicle came into sudden collision with another vehicle, tree, post or other object, the result would be that the inertia of the plunger 27 and its weight 29 would cause these parts to be shifted forward into the position indicated by dotted lines in Fig. 1, and in that manner release the pivoted nose 30, permitting it to swing downward and, in turn, release the retaining cord or connecting means with the pivoted circuit breaking lever 5, which thereupon would swing to the dotted or open position under the influence of the spring 8. This would cause the battery circuit 39 to be opened and the danger of igniting the escaping gasoline avoided.

Assuming further that the parts shown in Fig. 1 are arranged longitudinally of the vehicle and that the battery circuit was closed by adjustment of the parts to the position shown in solid lines, it will then be understood that if, from any cause, the automobile upset upon either side, the weight 29, acting as a pendulum, would retain the plunger 27 in its normal position, more or less, while the tube 21 and all the rest of the apparatus was rotated about the axis of the plunger, with the result that the ring 19 attached to the cord 18 would move about the nose and in following the groove 35 thereof shift itself off the nose, and in that manner release the circuit breaking lever 5 which, under the action of the spring 8, as before, would open the battery circuit.

The same result would occur if the parts, as shown in Fig. 1, were manipulated by rotating the plunger 27 through an arc of 90° relatively to the tube 21 and other parts, substantially as would occur if the automobile had overturned. In other words, my improved device is automatically responsive, either to collision conditions, or in the overturning of the vehicle, for the purpose of instantly interrupting the battery circuit so that no damage may occur from fire through the escape of gasoline.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim and desire to secure by Letters Patent is:

1. In an automatic circuit breaker for automobiles, the combination of a circuit breaking switch, a substantially horizontal guide, a movable part of fixed shape adapted to slide in the guide under impact of the vehicle and retain its shifted position by gravity and friction and said movable part also adapted to rotate in its guide in the event of the automobile overturning, either or both, and means separate from the rotatable part and guide mechanically controlled by the sliding and rotating part for causing the circuit breaking switch to be released, opened and held in open condition.

2. The invention according to claim 1, wherein further, the circuit breaking switch separate from the horizontal guide and movable part is provided with spring devices to move it into open position, and connecting means are provided between the switch lever and the movable part and arranged to be released when the said part either slides or rotates.

3. In an automatic circuit breaker for automobiles, the combination of a circuit breaking switch, a movable part adapted to slide under impact of the vehicle or rotate in the event of its overturning, either or both, and means controlled by the sliding and rotating part for causing the circuit breaking switch to be automatically released and opened, and wherein further, the circuit breaking switch is spring actuated for opening the circuit, and the movable part is slidably mounted in a rotary sleeve and having a gravity actuated pendulum, and detachable connecting means are arranged between the circuit breaking switch and the sliding and rotatable part for automatically releasing the circuit breaking switch whenever the sliding and rotatable part is put into sliding or rotating operation.

4. In an automatic circuit breaker for automobiles, the combination of a circuit breaking switch, means to move the switch normally into open position, a reciprocating plunger having a downwardly extending arm and weighted pendulum, guiding and supporting means for the plunger whereby it may rotate or slide, either or both, a pivoted nose piece on the end of the plunger, means for normally holding the nose piece in alinement with the plunger, and connecting means between the circuit breaking switch and the pivoted nose to release the circuit breaking switch by either a rotation of the nose or a shifting of the plunger to permit the nose to rotate about its pivot.

5. In an automatic circuit interrupter, the combination of a normally open circuit breaking switch having a movable operative part to close it, a longitudinal and substantially horizontal guide, a weighted sliding member in said guide having a pivoted part acting as a releasing device when the sliding member is shifted backward in the guide but normally held in retaining position until the shifting movement of the sliding member takes place, and connecting means between the operative part of the circuit breaking switch and the pivoted part acting as a releasing device when in retaining position for normally holding the switch closed and automatically releasing it when the said part is shifted to releasing position.

6. In an automatic circuit interrupter, the combination of a normally open circuit breaking switch, a spring to open it, a longitudinal and substantially horizontal bearing, a weighted pendulum member journaled in said bearing to swing sidewise about said bearing, connecting means controlled by the pendulum for holding the switch in closed position against the action of its spring, and automatic means for releasing the connecting means from control by the pendulum when it swings sidewise to permit the switch to automatically open under the influence of its spring.

In testimony of which invention, I hereunto set my hand.

JOSEPH F. GIBSON.